United States Patent
Koskan

(10) Patent No.: US 10,421,437 B1
(45) Date of Patent: Sep. 24, 2019

(54) SYSTEM AND METHOD FOR DYNAMIC PERIMETER THREAT DETECTION FOR A MOVABLE VEHICLE

(71) Applicant: MOTOROLA SOLUTIONS, INC, Chicago, IL (US)

(72) Inventor: Patrick D. Koskan, Jupiter, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 16/225,499

(22) Filed: Dec. 19, 2018

(51) Int. Cl.
  *B60R 25/31* (2013.01)
  *G08B 13/181* (2006.01)
  *B60R 25/102* (2013.01)

(52) U.S. Cl.
  CPC ............ *B60R 25/31* (2013.01); *B60R 25/102* (2013.01); *G08B 13/181* (2013.01)

(58) Field of Classification Search
  CPC ...... B60R 25/31; B60R 25/102; G08B 13/181
  See application file for complete search history.

(56) References Cited

U.S. PATENT DOCUMENTS

| | | | |
|---|---|---|---|
| 6,741,165 B1* | 5/2004 | Langfahl | B60R 25/1004 307/10.2 |
| 7,103,473 B2* | 9/2006 | Ranjan | G01C 21/3667 340/905 |
| 8,131,429 B2* | 3/2012 | Plaster | B60R 25/102 701/45 |
| 8,564,661 B2 | 10/2013 | Lipton et al. | |
| 8,624,727 B2 | 1/2014 | Saigh et al. | |
| 9,489,545 B2 | 11/2016 | Hirsch et al. | |
| 9,600,992 B1* | 3/2017 | Kolla | G08B 21/0261 |
| 9,924,085 B2* | 3/2018 | Intagliata | B60R 1/00 |
| 9,959,731 B2* | 5/2018 | Kolla | G08B 21/0261 |
| 10,131,323 B1* | 11/2018 | Sterling | B60R 25/31 |
| 2010/0198463 A1* | 8/2010 | Plaster | B60R 25/102 701/45 |
| 2011/0298579 A1 | 12/2011 | Hardegger et al. | |
| 2012/0284769 A1* | 11/2012 | Dixon | H04W 4/021 726/1 |
| 2012/0306660 A1* | 12/2012 | Stopel | H04W 4/029 340/686.1 |
| 2016/0307420 A1 | 6/2016 | Delean | |
| 2017/0086050 A1 | 3/2017 | Kerning et al. | |
| 2017/0369034 A1* | 12/2017 | Bilik | B60R 25/34 |

* cited by examiner

*Primary Examiner* — Nay Tun
(74) *Attorney, Agent, or Firm* — Daniel R. Bestor

(57) ABSTRACT

A process for dynamic vehicular perimeter threat detection includes first identifying a vehicle destination location. Vehicular perimeter contextual parameters including an incident type, a historical crime rate, or a real-time crime rate associated with the vehicle destination location are retrieved. A perimeter distance of a sized vehicular geofence surrounding the vehicle is modified as a function of the vehicular perimeter contextual parameters. A 360 degree vehicular light imaging or radio wave distancing system physically coupled to the vehicle detects a breach of the sized vehicular geofence. One or more target electronic devices to notify of the detected breach are identified. And a notice of breach message provided to the identified one or more target electronic devices.

20 Claims, 6 Drawing Sheets

SYSTEM AND METHOD FOR DYNAMIC PERIMETER THREAT DETECTION FOR A MOVABLE VEHICLE

BACKGROUND OF THE INVENTION

First responders and other types of users, such as private security personnel, may be under a constant threat of physical harm and safety based on their position and/or function. This is especially true when the first responder is within or nearby his or her vehicle and has his or her attention focused on other activities, such as writing incident reports or researching case or offender information via personal or vehicular electronic devices. As a result, the first responder may not be alert and may be more likely to inadvertently subject himself or herself to an unsafe situation.

Technologies exist to create virtual perimeters and to detect breaches of those perimeters, such as via video imaging and applied analytic techniques to warn of a breach of such a perimeter. For example, a perimeter may be established surrounding a building and a breach of the perimeter detected by a motion sensing analytic operating on an imaging camera directed at the building perimeter.

However, current technical solutions for perimeter breach detections based on fixed and/or pre-configured perimeters are not well adapted to the dynamic nature of a vehicle and the varying environments it may be subjected to. Furthermore, in order to be effective, an established perimeter threat detection system must avoid false positive notifications and notify the first responder of a breach in a determined right way at a determined right time to avoid the feature from simply being turned off. However, current technical solutions are not dynamic enough to avoid such false positives and tend to over-notify or under-notify in various in-opportune contexts.

Thus, there exists a need for an improved technical method, device, and system for dynamic perimeter threat detection for a movable vehicle.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
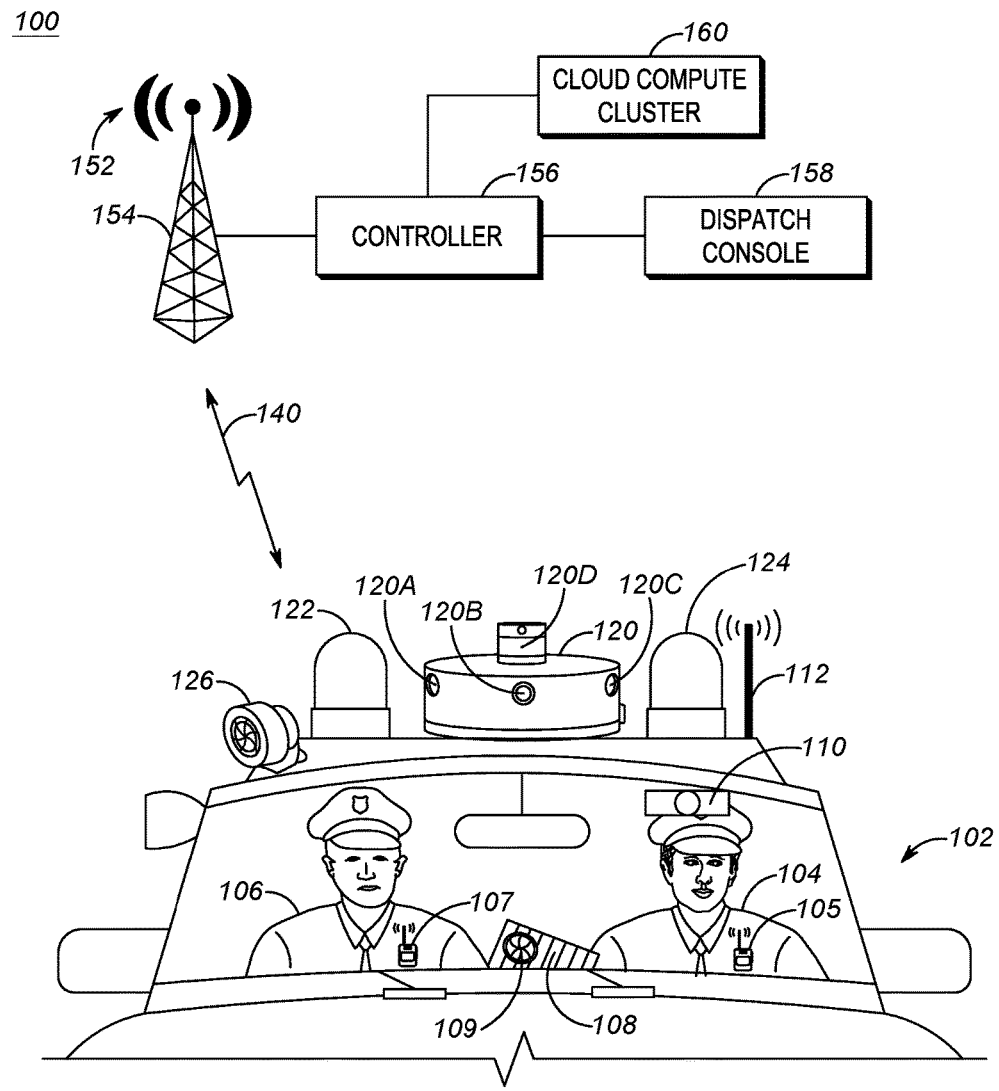
FIG. 1 is a system diagram illustrating an example operating environment for dynamic perimeter threat detection for a movable vehicle, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved technical method, device, and system for dynamic perimeter threat detection for a movable vehicle.

In one embodiment, a process for dynamic vehicular perimeter threat detection includes: identifying, by a vehicular computing device, a vehicle destination location associated with one of a current stopped location of a vehicle and a programmed destination stop location of the vehicle; retrieving, by the vehicular computing device, one or more vehicular perimeter contextual parameters including one or more of an incident type associated with the vehicle destination location, a historical crime rate associated with the vehicle destination location, and a real-time crime rate associated with the vehicle destination location; modifying, by the vehicular computing device, one or more perimeter distances of a sized vehicular geofence surrounding the vehicle as a function of the one or more vehicular geofence contextual parameters; detecting, via a 360 degree vehicular light imaging or radio wave distancing system physically coupled to the vehicle and communicably coupled to the vehicular computing device, a breach of the sized vehicular geofence; identifying, by the vehicular computing device, one or more target electronic devices to notify of the detected breach including at least one of (i) a target electronic device associated with a registered occupant of the vehicle and (ii) an audio and/or visual output target electronic device fixed to an exterior or interior of the vehicle; and responsive to detecting the breach, causing, by the vehicular computing device, a notice of breach message to be provided to the identified one or more target electronic devices.

In a further embodiment, an electronic processing system for dynamic vehicular perimeter threat detection includes: a memory; a transceiver; one of a 360 degree vehicular light imaging and a radio wave distancing system physically coupled to a vehicle; and one or more processors configured to: identify a vehicle destination location associated with one of a current stopped location of a vehicle and a programmed destination stop location of the vehicle; retrieve one or more vehicular perimeter contextual parameters including one or more of an incident type associated with the vehicle destination location, a historical crime rate associated with the vehicle destination location, and a real-time crime rate associated with the vehicle destination location; modify one or more perimeter distances of a sized vehicular geofence surrounding the vehicle as a function of the one or more vehicular geofence contextual parameters; detect, via the one of the 360 degree vehicular light imaging and radio wave distancing system physically coupled to the vehicle and communicably coupled to the one or more processors, a breach of the sized vehicular geofence; identify one or more target electronic devices to notify of the detected breach including at least one of (i) a target electronic device associated with a registered occupant of the vehicle and (ii) an audio and/or visual output target electronic device fixed to an exterior or interior of the vehicle; and responsive to detecting the breach, cause a notice of breach message to be provided, via the transceiver, to the identified one or more target electronic devices.

Each of the above-mentioned embodiments will be discussed in more detail below, starting with an example communication system and a device architecture of an electronic computing device and system in which the embodiments may be practiced, followed by an illustration of processing steps for achieving an improved method, device, and system for dynamic perimeter threat detection for a movable vehicle. Further advantages and features consistent with this disclosure will be set forth in the following detailed description, with reference to the figures.

1. COMMUNICATION SYSTEM AND DEVICE ARCHITECTURE a. Communication System Architecture Referring now to the drawings, and in particular FIG. 1, an example communication system diagram illustrates a system 100 including a first movable vehicle 102 and an example wireless infrastructure radio access network (RAN) 152. The first movable vehicle 102 is illustrated with two vehicle occupants including a first officer 104 driver having an associated personal radio communication device 105 and a second officer 106 passenger having an associated personal radio communication device 107, and is equipped with a vehicular computing device 108, an internal speaker 109, a driver's head and/or eye-tracking device 110, an antenna 112 communicatively coupled to a transceiver at the vehicular computing device for communicating with other computing devices in an ad-hoc manner or in an infrastructure manner via RAN 152, an integrated vehicular appliance 120 for capturing a 360° field-of-view in an area surrounding the movable vehicle 102 and for detecting approaching threats, external lights 122 and 124, and external speaker 126.

The movable vehicle 102 may be a human-operable vehicle, or may be a partially or fully self-driving vehicle operable under control of vehicular computing device 108 perhaps in cooperation with integrated vehicular appliance 120 (which may include one or more of visible-light camera(s), infrared light camera(s), time-of-flight depth camera(s), radio wave emission and detection (such as radio direction and distancing (RADAR) or sound navigation and ranging (SONAR)) device(s), and/or light detection and ranging (LiDAR) device(s) for self-driving purposes and/or for the other purposes as set forth herein). The vehicle 102 may include a location (and/or orientation) determination device integrated with or separately disposed in the vehicular computing device 108 and/or antenna 112 or associated transceiver for determining (and storing and/or transmitting) a location (and/or orientation) of the vehicle 102. The vehicular computing device 108 may further contain a mapping and routing application that may provide an input interface (touch, keyboard, voice, wireless transceiver, etc.) for a user such as first officer 104 to enter an intended destination or assigned incident location for the movable vehicle 102, and after which may provide directions to the first officer 104 to move the vehicle to the intended destination or assigned incident location or may control the movable vehicle 102, perhaps in cooperation with the integrated vehicular appliance 120, to actually move the vehicle 102 to the intended destination or assigned incident location.

The first officer 104 is illustrated in FIG. 1 as an officer (e.g. such as a police officer), but in other embodiments, may be any type of vehicle occupant, including one that may drive the vehicle to a particular intended destination or assigned incident location, or may enter an intended destination or assigned incident location into the vehicular computing device 108 prior to physically driving to the intended destination or assigned incident location, and who may be interested in dynamically establishing threat detection perimeter distance(s) at such an intended destination or assigned incident location and being notified of breaches of the dynamically established threat detection perimeter distance(s) in accordance with the disclosure set forth herein.

For example, first officer 104 may, in other embodiments, work for other governmental and non-governmental agencies such as park districts, real estate offices, or other types of security details. Similar considerations may be applied to the second officer 106. Each of the first officer 104 and second officer 106 is also equipped with an associated radio communication device 105, 107, which may be carried as a hip radio, as an integrated radio-speaker-microphone (RSM) device, or some other device capable of communicating via short-range and/or long-range wireless communication links with the vehicular computing device 108, with each other, and/or with controller 156 via RAN 152, among other possibilities.

Each of the radio communication devices 105, 107 may be any mobile computing device used for infrastructure RAN or direct-mode media (e.g., voice, audio, video, etc.) communication via a long-range wireless transmitter and/or transceiver that has a transmitter transmit range on the order of miles (e.g., 0.5-50 miles, or 3-20 miles and in comparison to a short-range transmitter such as a Bluetooth, Zigbee, or NFC transmitter) with other mobile computing devices and/or the infrastructure RAN 152. The long-range transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long-range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In addition to or as an alternative to the long-range transmitter or transceiver, each radio communication device 105, 107 (hereinafter, radios) may further contain a short-range transmitter or transceiver that has a transmitter transmit range on the order of meters (e.g., such as a Bluetooth, Zigbee, or NFC connection having a transmit range on the order of 0.01-100 meters, or 0.1-10 meters) for communicating with each other or with other computing devices such as vehicular computing device 108. Each radio communication device 105, 107 may further contain one or more physical electronic ports (such as a USB port, an Ethernet port, an audio jack, etc.) for direct electronic coupling with other computing devices such as vehicular computing device 108 or for coupling with other accessories such as a radio speaker microphone (RSM).

Each radio 105, 107 may additionally contain a push to talk (PTT) button that enables transmission of voice audio captured at a microphone of the radio 105, 107 to be transmitted via its short-range or long-range transceiver to other radio communication devices or to other computing devices such as dispatch console 158 via RAN 152, and enables reception of voice audio (when not depressed) received at the radio communication device via its long-range or short-range receiver and played back via a speaker of the radio communication device. In those embodiments where the radio communication device is a full-duplex device, instead of a half-duplex device, depression of the PTT button may allow simultaneous transmission and reception of voice audio, instead of mere reception, among other communication media types such as video. Each radio communication device 105, 107 may further include a display screen for displaying images, video, and/or text to the users/officers 104, 106 or to someone else. Such a display screen may be, for example, a liquid crystal display (LCD) screen or an organic light emitting display (OLED) display screen. In some embodiments, a touch sensitive input interface may be incorporated into the display screen as well, allowing the users/officers 104, 106 to interact with content provided on the display screen. A soft PTT input may also be provided, for example, via such a touch interface. Furthermore, a video camera may be provided at each radio communication device 105, 107, integrating an ability to capture images and/or video and store the captured image data (for further analysis) or transmit the captured image data as an image or video stream to the vehicular computing device 108, to other radio communication devices, and/or to other computing devices via RAN 152.

Vehicular computing device 108 may be any computing device specifically adapted for operation within the vehicle 102, and may include, for example, a vehicular console computing device, a tablet computing device, a laptop computing device, or some other computing device commensurate with the rest of this disclosure and may contain many or all of the same or similar features as set forth above with respect to radios 105, 107. In some embodiments, the vehicular computing device 108 may form a hub of communication connectivity for one or more of the associated radio communication device 105, 107, the driver's head and/or eye-tracking device 110, the integrated vehicular appliance 120, the external lights 122, 124, and the speakers 109, 126, each of which may be communicatively coupled to the vehicular computing device 108 via one or both of a wired communication link and a short-range wireless communication link. The vehicular computing device 108 may further include or have access to a transceiver and may be coupled to antenna 112 and through which the vehicular computing device 108 itself and the above-mentioned other devices may further communicate with or be accessed by a long-range wireless communication link with RAN 152, such as via LTE or LMR.

Internal speaker 109 is an audio output-device communicatively coupled to the vehicular computing device 108, and perhaps indirectly paired to one or both of the radio communication device 105, 107, for playing back audio such as a public safety tone, series of tones, or spoken words that may then be perceived by occupants within the vehicle such as the first officer 104 and/or the second officer 106. In some embodiments, speaker 109 may be replaced with a plurality of speakers displaced throughout the internal cabin of the vehicle 102 and selectively enabled in accordance with a detected breach of a particularly sized vehicular geofence surrounding the vehicle such that a particular one of the plurality of speakers closest to the breach is selected to playback the tone, spoken notification, or other type of speech output to indicate a relative direction of the breach.

The driver's head and/or eye-tracking device 110 may be any optical and/or mechanical system for identifying and determining a direction of intent of the first officer 104 with respect to one or both of a first video recording trigger and a second video recording trigger and for providing head and/or gaze direction information in one or more electronic messages to another computing device for further processing, such as the vehicular computing device 108 or the integrated vehicular appliance 120, and/or to remote computing device such as the controller 156 via RAN 152, among other possibilities.

For example, and as illustrated in FIG. 1, the driver's head and/or eye-tracking device 110 may be a rear-facing (in relation to the rear of the car) optical recording device that is capable of tracking a location of the driver's head and/or eye gaze and determining, based on the optical tracking, a direction in which the first officer 104 is looking (where 0° is directly forward and out of the page in the figure and where 90° is tangentially to the first officer's 104 left in a direction opposite the direction of second officer 106). For example, the rear-facing camera may optically track the first officer's 104 gaze using infrared light reflections to track movements in a center of the pupil, front of the cornea, and/or back of the lens, or by tracking movements in detected retinal blood vessels. In other embodiments, the rear-facing camera may use face-detection on captured 2D images to detect a direction in which the first officer's 104 face is directed. Still further, a depth camera may be use face detection on captured 3D depth images to detect a direction in which the first officer's 104 face is directed. Other possibilities for optical tracking exist as well.

The integrated vehicular appliance 120 is a communicatively coupled set of one or more electronic ranging devices that may include one or more capture-only devices and/or one or more emit and capture devices. More specifically, the set of one or more electronic ranging devices may include one or more of visible-light capture camera(s), infrared capture camera(s), time-of-flight depth camera(s), radio wave distancing device(s), and/or light detection and ranging (LiDAR) device(s), among other possibilities. The integrated vehicular appliance 120 is physically coupled to the vehicle 102, such as centrally positioned atop the vehicle 102 as illustrated in FIG. 1, or in other embodiments, may be distributed amongst various satellite locations around the vehicle and wiredly or wirelessly coupled to a centralized processing device such as an enclosure same or similar to that illustrated in FIG. 1 as the integrated vehicular appliance 120 or perhaps to the vehicular computing device 108, among other possibilities. When disposed in a distributed fashion, portions of the integrated vehicular appliance 120 may be disposed in other parts of the vehicle 102, such as in the external lights 122 and 124 (which in other embodiments not illustrated may take the form of an elongated light bar positioned atop the vehicle 102), within one or more side or rear view mirrors, integrated into a rear-view camera, or other locations or devices distributed across the internal or external portions of the vehicle 102 and having a view surrounding the vehicle 102.

The integrated vehicular appliance 120 is configured, by itself or in cooperation with vehicular computing device 108, to detect a breach of a particularly sized vehicular geofence surrounding the vehicle. The integrated vehicular appliance 120 may be continuously on and leveraging its electronic ranging devices to detect a breach of the particularly sized vehicular geofence surrounding the vehicle, may only periodically be turned on at a regular or semi-regular cadence to detect whether any breaches of the particularly sized vehicular geofence surrounding the vehicle have occurred, or may be trigged to begin scanning for breaches of the particularly sized vehicular geofence surrounding the vehicle upon occurrence of some other trigger detected at the integrated vehicular appliance 120 or vehicular computing device 108, or upon receipt of an instruction from, for example, the vehicular computing device 108 or the RAN 152, among other possibilities.

The one or more electronic ranging devices may comprise a single scanning device having a field of view of less than 360° and that is then caused to rotate and scan at a particular frequency, such as rotating 1-10 times per second to create a 360° field of view of the area surrounding the integrated vehicular appliance 120 and thus the vehicle 102 to which it is attached. In other embodiments, a plurality of range detection devices, each having a field of view less than 360°, may be statically placed around the integrated vehicular appliance 120 or in a distributed manner around the vehicle 102 as set forth earlier, to altogether enable a 360° field of view of the area surrounding the integrated vehicular appliance 120 and thus the vehicle 102 to which it is attached. In still other embodiments, and for both visible or infrared light imaging systems and radio-wave imaging systems, complex optics and/or waveguides may be used to enable capture of a 360° field of view in a single static light imaging or radio wave detection sensor, for example, after which image processing or radiometry processing algorithms may be used to de-warp or otherwise compensate for distortions introduced into the captured data by the optics and/or waveguides, as necessary. As just one example, and as illustrated in FIG. 1, the integrated vehicular appliance 120 may include one or more static visible light imaging devices 120A-C each having an approximate 90° field of view (and further including a fourth imaging device facing backwards and not illustrated in FIG. 1) that may be combined optically or digitally at the integrated vehicular appliance 120 or the vehicular computing device 108 to provide visible-light imaging functionality across a 360° field-of-view, and may further include an active scanning RADAR emitter and detector 120D positioned above the visible light imaging devices 120A-C to provide both light-imaging and radio wave reflection range detection capabilities. Other arrangements and combinations are possible as well.

Data produced by the electronic ranging devices may then be used at the integrated vehicular appliance 120 and/or the vehicular computing device 108 to determine a range (relative to the vehicle 102) of one or more objects approaching the vehicle, perhaps in addition to other characteristics of the approaching object including but not limited to, a cross-sectional shape, an initial position, a current position, a velocity, an acceleration, a bearing, and/or a size (length, width, and/or height) of the object. The integrated vehicular appliance 120 and/or the vehicular computing device 108 may also then use the characteristics to predict a future location, path, trajectory, or status of the object. Such characteristics may additionally or alternatively be used to classify the object as a person (including type of person such as adult or child), vehicle (including type of vehicle such as car, motorcycle, or airborne drone), animal (including type of animal such as cat or dog), or other type of object. Such characteristics, predictions, and classifications may be stored in a memory at the integrated vehicular appliance 120 and/or the vehicular computing device 108 accompanying or separate from an image, point cloud, or echo map illustrative of the object or objects detected by the electronic ranging devices. The characteristics, predictions, and classifications and/or the image, point cloud, or echo maps may be stored at the integrated vehicular appliance 120 and/or the vehicular computing device 108, and/or may be transmitted to a separate storage or processing device (such as controller 156, dispatch console 158, or cloud computer cluster 160) via infrastructure RAN 152, among other possibilities.

Each of the electronic ranging devices may have an associated ranging function associated with it for determining an approximate range of a detected object from the integrated vehicular appliance 120 and thus the vehicle 102. For example, for visible light or infrared light imaging devices incorporated into integrated vehicular appliance 120, pre-configured portions of the captured image frames may be associated with particular distances. For example, a lower quarter of the frame, perhaps identified via pixel count, may be associated with a distance of 5-10 m (or 7*m*) from the vehicle, while a second quarter of the frame may be associated with a distance of 10-20 m (or 15*m*) from the vehicle, and a remainder of the frame associated with indeterminate distances or above-horizon distances. Such mappings between frame portions and distances may be varied based on parameters such as pan, tilt, zoom settings (if any) of the imaging cameras, a detected orientation of the vehicle 102 and/or integrated vehicular appliance 120 beyond level, or other detected variations. In still other embodiments, direct mappings may not be used, but instead, analytics applied to capture images that use known or learned sizes of known or learned objects detected in the frame to calculate relative distances from the vehicle 102 or integrated vehicular appliance 120 to detected objects. For example, other vehicles or other people captured in the frame may be compared to known or average sizes of such objects to then infer a distance in the image to a particular detected object. Other methods of determining a distance to an object in a captured image could be used as well. On the other hand, for emission and detection systems such as LiDAR and RADAR, time of flight information measured from the time of emission to the time of detection, and knowledge/pre-configuration of the speed of such emissions through air, may be used to directly calculate an estimated distance from the vehicle 102 or integrated vehicular appliance 120 to detected objects.

External lights 122, 124 may be any type of externally-perceivable visible lights and may include an underlying LED, incandescent, and/or halogen lamp whose light output is constant and unidirectional or which may be modulated into a strobe, directional rotating, blinking, or otherwise non-static and/or focused output, and may comprise a white or colored (e.g., red, blue, etc.) light. While external lights 122, 124 are depicted in FIG. 1 as separately placed individual lights, in other embodiments, light bars that span substantially the entire width of the roof of the vehicle 102 with a number of same or different sized and/or colored lights in various matrix arrays may be included as well.

External speaker 126 is a speaker, such as a horn or siren, including an amplifier that broadcasts an externally-perceivable audio output such as a public safety tone, series of tones, or spoken words that may be perceived by other officers, civilians, or suspects nearby while outside of the vehicle 102. In some embodiments, and similar to the internal speaker 109, the external speaker 126 may be replaced with a plurality of speakers displaced throughout the external body of the vehicle 102 and selectively enabled in accordance with a detected breach of the particularly sized vehicular geofence surrounding the vehicle 102 such that a particular one of the plurality of speakers closest to the breach is selected to playback a tone, spoken notification, or other type of speech output to indicate a relative direction of the breach or selectively enabled in accordance with a detected location of officers (such as officers 104, 106) located in an area outside of the vehicle 102 such that a particular one of the plurality of speakers closest to the detected location of the officer or officers is selected to playback a tone, spoken notification, or other type of speech output to indicate a breach. In still other embodiments, a physical pan, tilt mechanism may be used to effect directionality of sound emitting from directional external speaker 126, while in other embodiments, a plurality of speakers in a matrix configuration may be used to beam steer audio output from the external speaker 126 to a particular location commensurate with the location of the breach of the location of the officer or officers. Other possibilities exist as well.

Infrastructure RAN 152 may implement over wireless link(s) 140 a narrowband wireless system such as a conventional or trunked LMR standard or protocol, which may include an ETSI DMR, a P25 standard defined by the APCO, TETRA, or other LMR radio protocols or standards. In other embodiments, infrastructure RAN 152 may additionally or alternatively implement over wireless link(s) 140 a broadband wireless system such as an LTE protocol including MBMS, an OMA-PoC standard, a VoIP standard, or a PoIP standard. In still further embodiments, infrastructure RAN 152 may additionally or alternatively implement over wireless link(s) 140 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well.

The infrastructure RAN 152 is illustrated in FIG. 1 as providing coverage for the vehicle 102 and its occupants via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher. In other embodiments, more or different types of fixed terminals may provide RAN services to the vehicle 102 and its vehicle occupants and may or may not contain a separate controller 156 and/or dispatch console 158.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half-duplex mobile devices, but uses mobile devices operating over modern broadband telecommunications networks. Using OMA-PoC, wireless mobile devices such as mobile telephones and notebook computers can function as PTT half-duplex mobile devices for transmitting and receiving. Other types of PTT models and multimedia call models (MMCMs) could be used as well.

Floor control in an OMA-PoC session is generally maintained by a PTT server that controls communications between two or more wireless mobile devices. When a user of one of the mobile devices keys a PTT button, a request for permission to speak in the OMA-PoC session is transmitted from the user's mobile device to the PTT server using, for example, a real-time transport protocol (RTP) message. If no other users are currently speaking in the PoC session, an acceptance message is transmitted back to the user's mobile device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other mobile devices in the group of mobile devices or talkgroup to which the user is subscribed), using for example, one or more of a unicast, point to multipoint, or broadcast communication technique.

Infrastructure LMR wireless systems, on the other hand, may operate in either a conventional or trunked configuration. In either configuration, a plurality of mobile devices is partitioned into separate groups of mobile devices. In a conventional narrowband radio system, each mobile device in a group is selected to a particular radio channel (frequency or frequency & time slot) for communications associated with that mobile device's group. Thus, each group is served by one channel, and multiple groups may share the same single frequency (in which case, in some embodiments, group IDs may be present in the group data to distinguish between groups using the same shared frequency).

In contrast, a trunked narrowband radio system and its mobile devices use a pool of traffic channels for virtually an unlimited number of groups of mobile devices (e.g., talkgroups). Thus, all groups are served by all channels. The trunked radio system works to take advantage of the probability that not all groups need a traffic channel for communication at the same time. When a member of a group requests a call on a control or rest channel on which all of the mobile devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile devices were idling to a traffic channel for the call, and instruct all mobile devices that are not participating in the new call to move to a newly assigned control or rest channel selected from the pool of available channels. With a given number of channels, a much greater number of groups can be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., mobile devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, mobile devices may dynamically affiliate with a group (and also disassociate with the group) perhaps based on user input, and the switching and/or radio network may track group membership and route new group calls according to the current group membership.

The controller 156 illustrated in FIG. 1, or some other backend electronic computing device existing on-premises or in the remote cloud compute cluster 160 accessible via an IP network (such as the Internet), may additionally or alternatively operate as a back-end electronic digital assistant, a back-end audio and/or video processing electronic computing device, and/or a remote cloud-based storage device consistent with the remainder of this disclosure.

b. Device Architecture

Figure 2:
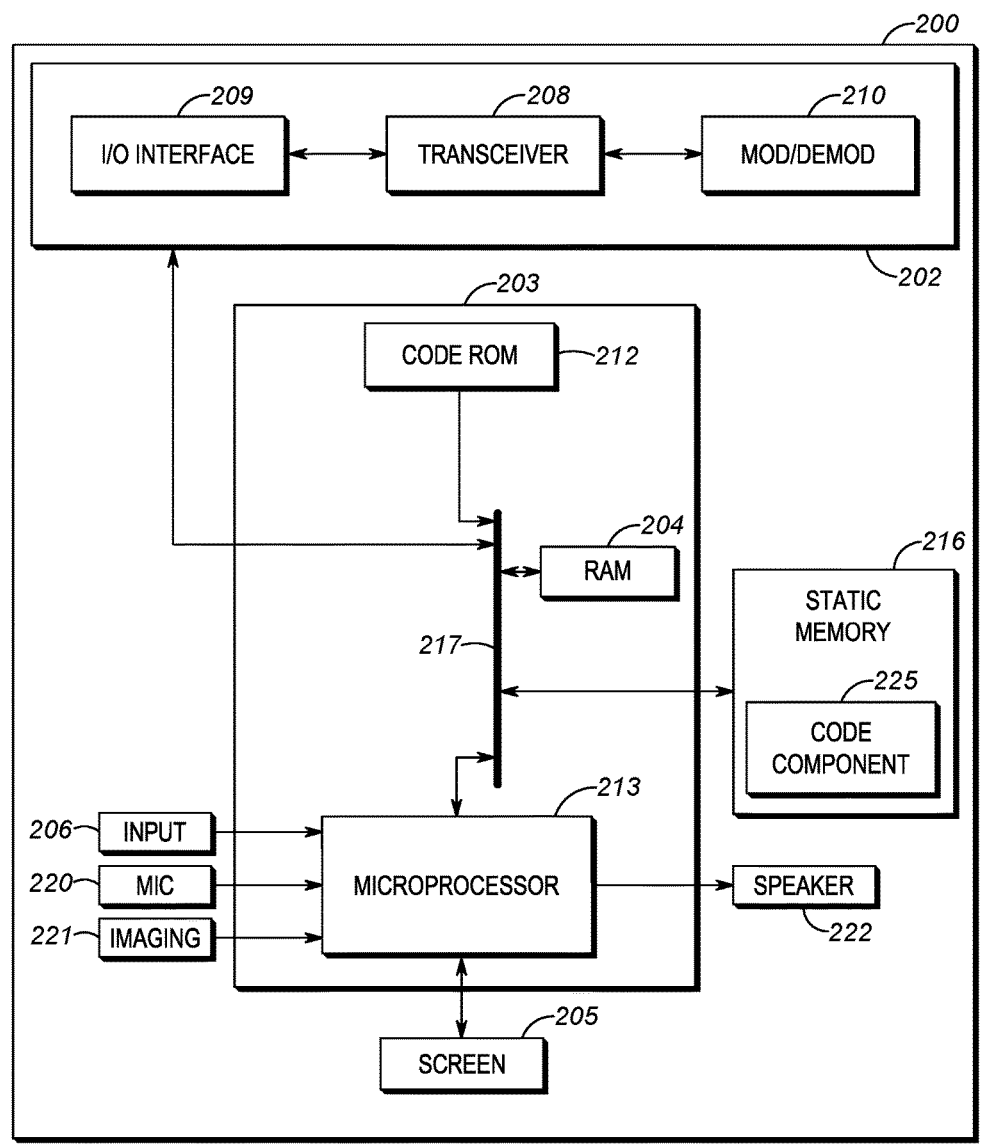
FIG. 2 is a device diagram showing a device structure of an electronic computing device for dynamic perimeter threat detection for a movable vehicle, in accordance with an embodiment.

Now referring to FIG. 2, a schematic diagram illustrates an electronic computing device 200 according to some embodiments of the present disclosure. The communication device 200 may be, for example, embodied in the radios 105, 107, the vehicular computing device 108, the integrated vehicular appliance 120, the infrastructure controller 156, the dispatch console 158, one or more computing devices in the cloud computing cluster 160, or some other communication device not illustrated in FIG. 1, and/or may be a distributed communication device across two or more of the foregoing (or multiple of a same type of one of the foregoing) and linked via a wired and/or wireless communication link(s).

While FIG. 2 may represent the devices as described above with respect to FIG. 1, depending on the type of the device, the communication device 200 or other devices may include fewer or additional components in configurations different from that illustrated in FIG. 2. For example, in some embodiments, the communication device 200 acting as the infrastructure controller 156 of FIG. 1 may not include one or more of the screen 205, microphone 220, imaging device 221, and speaker 222. As another example, in some embodiments, the communication device 200 acting as the radio 105, 107 or vehicular computing device 108 of FIG. 1 may further include a location determination device (for example, a global positioning system (GPS) receiver). As still another example, in some embodiments, the communication device 200 acting as the integrated vehicular appliance 120 of FIG. 1 may not include the microphone input 220, the screen 205, the user interface input 206, and the speaker 222. Other combinations are possible as well.

As shown in FIG. 2, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or a user input interface device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images or radio echoes or point clouds) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the radio 105, 107, the wireless RAN 152, and/or the vehicular computing device 108, over which incoming calls may be received and over which communications with remote databases and/or servers may occur.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the user input interface device 206, and/or the speaker 222. Static memory 216 may store operating code 225 for the electronic processor 213 that, when executed, performs one or more of the blocks set forth in FIG. 3 and the accompanying text. The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. PROCESSES FOR DYNAMIC PERIMETER THREAT DETECTION FOR A MOVABLE VEHICLE

Figure 3:
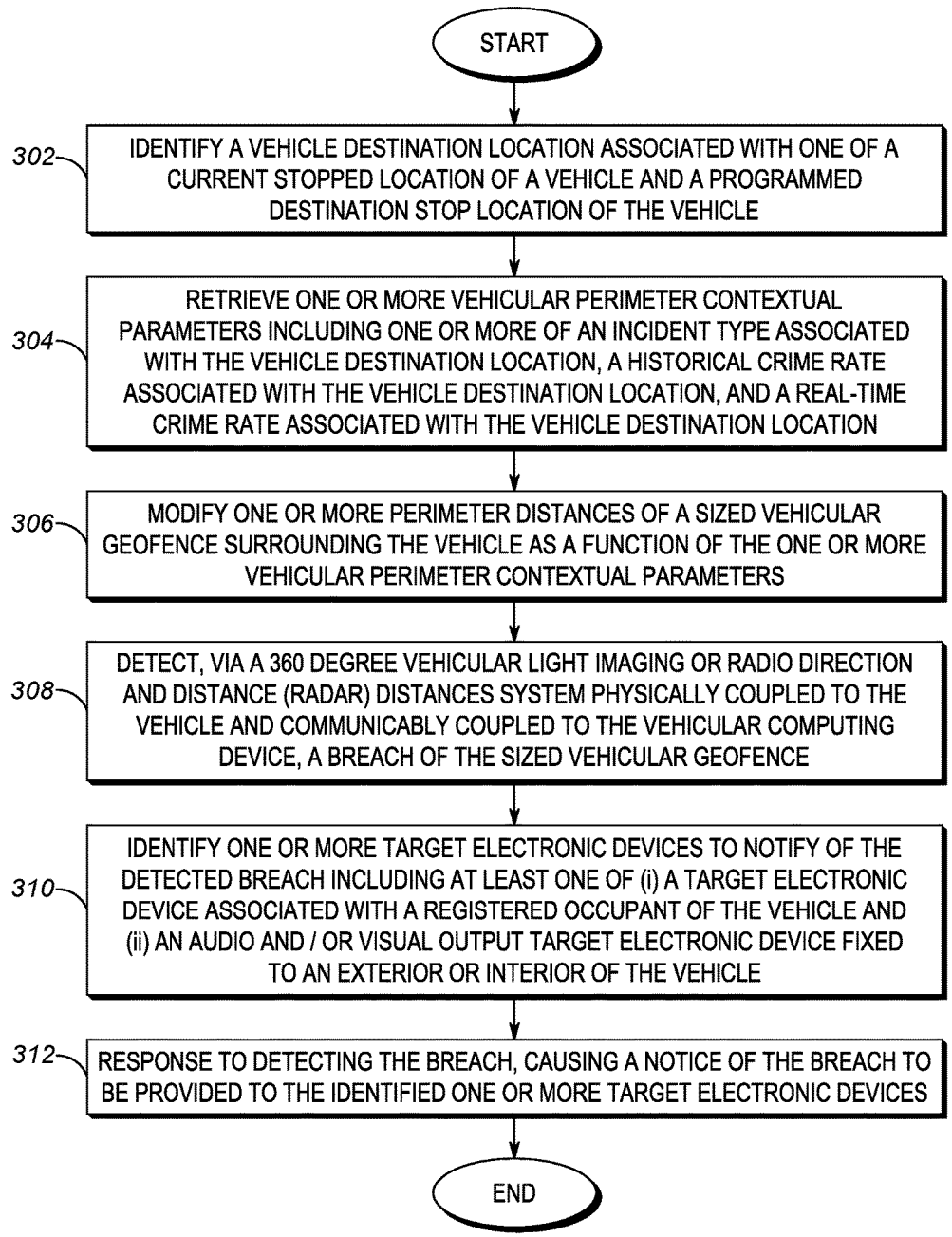
FIG. 3 illustrates a flow chart setting forth process steps for dynamic perimeter threat detection for a movable vehicle, in accordance with an embodiment.
Figure 4A:
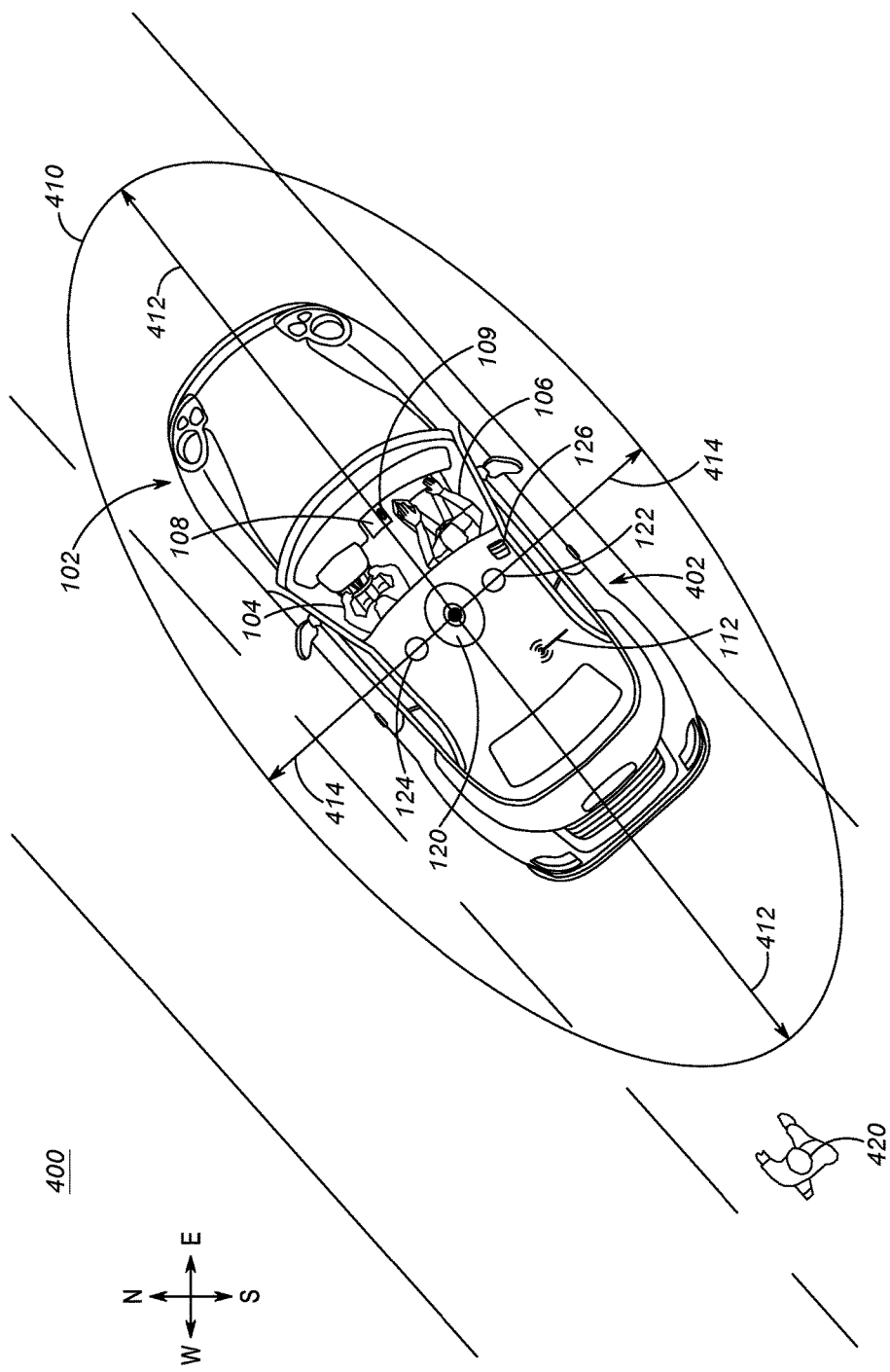
FIG. 4A is a plan view illustrating a first example of dynamic perimeter threat detection for a movable vehicle where no breach is yet detected, in accordance with an embodiment.
Figure 4B:
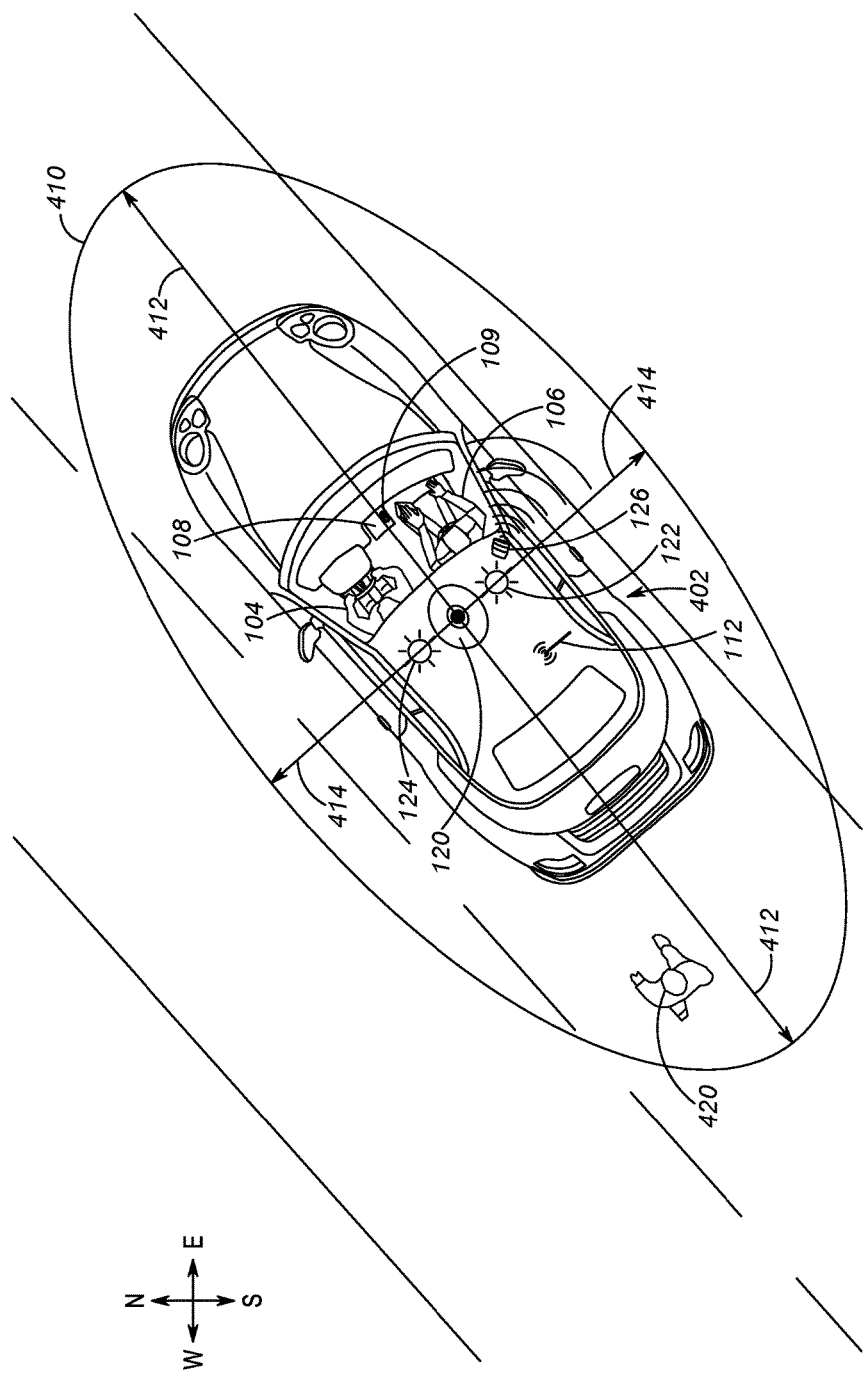
FIG. 4B is a plan view further illustrating the first example of dynamic perimeter threat detection for the movable vehicle where a breach is detected, in accordance with an embodiment.
Figure 5:
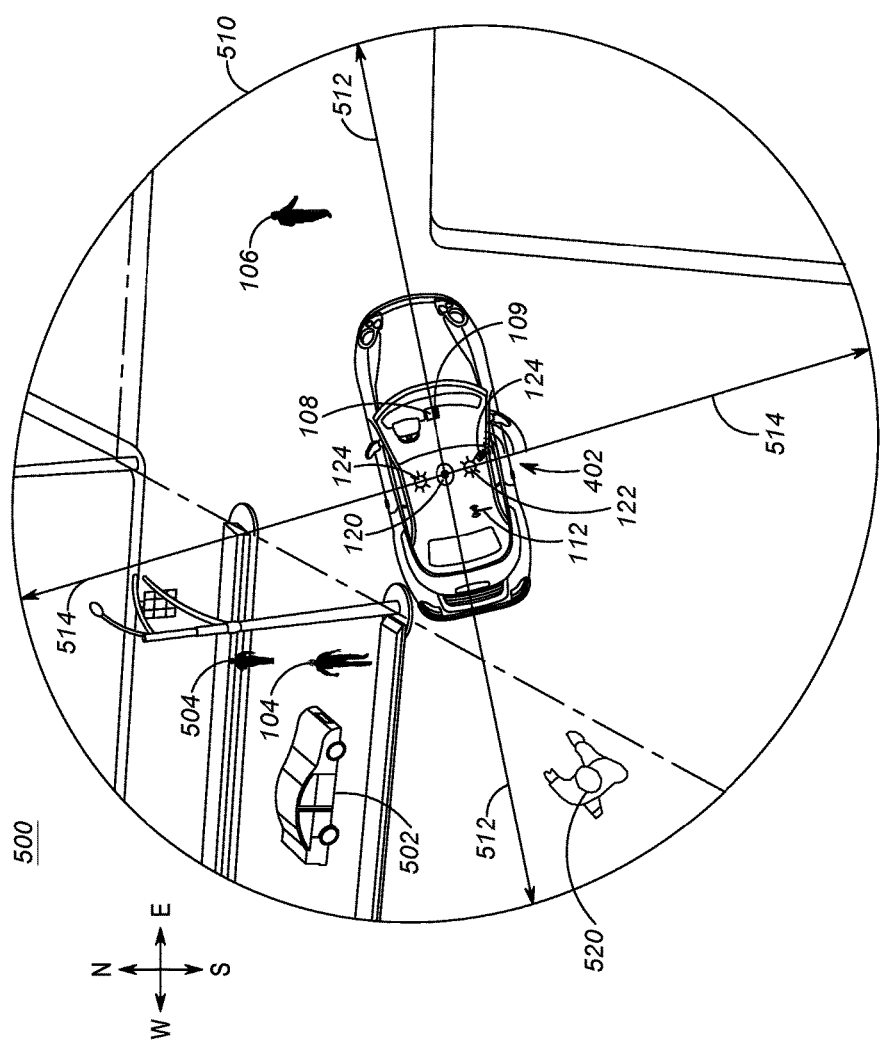
FIG. 5 is a plan view illustrating a second example of dynamic perimeter threat detection for a movable vehicle where a breach is also detected, in accordance with an embodiment.

Turning now to FIGS. 3-5, a flow chart diagram in FIG. 3 illustrates a process 300 for dynamic perimeter threat detection for a movable vehicle. FIGS. 4-5 set forth plan views illustrating various blocks of process 300 in example scenarios. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure. A corresponding electronic computing device, such as the vehicular computing device 108 of FIG. 1 and/or the electronic computing device 200 of FIG. 2, and embodied as a singular electronic computing device or distributed electronic computing device as set forth earlier, may execute process 300.

Process 300 begins at block 302 where the electronic computing device identifies a vehicle destination location associated with one of a current stopped location of the vehicle and a programmed destination stop location of the vehicle. As one example, the vehicle destination location could be determined by the electronic computing device itself based on a current location determination function, such as by receiving current GPS coordinates from an integrated or communicatively coupled GPS receiver circuit, or perhaps via a triangulation function in cooperation with two or more communications towers or other radiation emitting devices detected at the electronic computing device via a receiver or transceiver circuit integrated with or communicatively coupled to the electronic computing device. In still further embodiments, image or video analytics operating at a coupled image capture device such as one operating at the integrated vehicular appliance 120 of FIG. 1 may recognize cross-streets, or building addresses or business names, that can be associated with a current vehicle destination location of the vehicle.

In some embodiments, a detected stopping of the vehicle detected via a gyroscope-based motion sensing device integrated in the vehicular computing device or communicatively coupled to the electronic computing device, or a detected placement of the vehicle transmission into park, may then trigger the electronic computing device to determine the vehicle's current vehicle destination location for the purposes of process 300.

In still other embodiments, the electronic computing device may receive an indication of a programmed stop location destination of the vehicle such as via a detected entry (e.g., user entry such as by officer 104 of FIG. 1) of an intended destination in a mapping application operating at the electronic computing device or at another computing device (such as radio 105) in the vehicle that then provides the indication of the entered intended destination to the electronic computing device via a wired or wireless communication link. In still other embodiments, the electronic computing device may receive an indication of an assigned incident for the vehicle 102 or officer 104 to respond to, and may use a location of the assigned incident (for example, provided to the vehicular computing device 108 from dispatch console 158 via RAN 152) included in the indication or otherwise separately provided or determined via a request for a location of the incident, to identify an intended destination of the vehicle. Other examples are possible as well.

Processing then proceeds to block 304, where the electronic computing device retrieves one or more vehicular perimeter contextual parameters including one or more of an incident type associated with the vehicle destination location, a historical crime rate associated with the vehicle destination location, and a real-time crime rate associated with the vehicle destination location. The retrieved one or more vehicular perimeter contextual parameters may be retrieved from local storage at the electronic computing device, remote storage such as at the cloud computer cluster 160 of FIG. 1, or the electronic computing device may be provided the one or more vehicular perimeter contextual parameters in a same or similar way to the vehicle destination location as, or at, block 302.

As one example, the electronic computing device at block 304 may retrieve an incident type associated with the vehicle destination location as one of the vehicular perimeter contextual parameters. The incident type may be selected from, for example, a public safety incident type (such as a noise complaint, a domestic battery, a burglary, or a homicide) or an industrial incident type (such as a trespassing report, a hazardous chemical leak, or a fire), among other possibilities.

The retrieved incident type may be entered into the electronic computing device via a user input interface at the electronic computing device (such as at the vehicular computing device 108) or some other device communicably coupled to the electronic computing device (such as at the radio 105) and thus received at the electronic computing device at block 304. Additionally or alternatively, the retrieved incident type may be provided to the electronic computing device via an infrastructure computing device such as dispatch console 158 as a part of a dispatch process for dispatching vehicle 102 and/or officer 104 of FIG. 1 to a particular incident, and may thus be received via an intervening RAN such as RAN 152 of FIG. 1. In some embodiments, the incident type may be provided accompanying (e.g., in a same data packet, transmission, or set of transmissions) as the vehicle destination location of block 302 associated with the incident.

In various embodiments, the electronic computing device may maintain an incident type to personal-risk mapping, or have access to such an incident type to personal-risk mapping, that for each type of incident that the vehicle 102 may respond to, sets forth a stored relative personal risk to the occupants including the driver officer 104 of FIG. 1, for example. For example, of those incidents noted above, a noise complaint, a hazardous chemical leak, and a fire may be associated with a stored low personal risk to the occupants of the vehicle to the extent that there is likely no unknown human perpetrator potentially involved that may continue to pose a risk and be mapped to a stored low danger to the arriving vehicle and/or occupants. On the other hand, a domestic battery, a burglary, and a trespassing report all inherently involve a risk that an unknown human perpetrator involved in the incident may continue to be present in the area and may thus pose a risk and be mapped to a stored medium relative risk of danger to the arriving vehicle and/or occupants. And lastly, a homicide incident type involves a much higher risk that an unknown human perpetrator involved in the incident may continue to be present in the area and may thus pose a risk and be mapped to a stored high relative personal risk of danger to the arriving vehicle and/or occupants. In some embodiments, the mapping may set forth a numerical stored risk level, such that a low risk may have a mapped numerical value of 1 to 3, a medium risk a mapped numerical value of 4 to 7, and a high risk a mapped numerical value of 8 to 10 (out of 10).

In some embodiments, the retrieved incident type may not specify the type of incident as noted above, such as burglary or noise complaint, but instead may directly specify an incident area risk associated with the incident type, such as a low personal-risk incident type (or numerical risk level of 2) that may be associated with incidents such as a noise complaint, among other possibilities such as medium personal-risk incident type (or numerical risk level of 5) and high personal-risk incident type (or numerical risk level of 9). Other possibilities exist as well.

As a second example, the electronic computing device at block 304 may retrieve a historical crime rate associated with the vehicle destination location as one of the vehicular perimeter contextual parameters. Historical crime rates may be stored locally at the electronic computing device or remote computing device at, for example, cloud compute cluster 160, for various geographic areas (e.g., jurisdictions, buildings, towns, etc.) that the vehicle is likely to visit, and a particular historical crime rate retrieved from the local database or remote database by matching the vehicle destination location identified at block 302 with a location in the historical crime rate database. The retrieved historical crime rate may be a relative historical crime rate determined over a past number of days (e.g., 10-30), months (e.g., 1-12), or years (e.g., 1-5), such as high crime rate (or numerical rate of 8-10), a medium crime rate (or numerical rate of 4-7), or a low crime rate (or numerical rate of 1-3 out of 10) as defined in the database, or may be an overall measured historical crime rate (e.g., such as 10 violent incident/day and 5 non-violent incidents/day on average over the same days, months, or years, among various other possible absolute measurements) that may then be compared by the electronic computing device to threshold values of historical crime rates stored at the electronic computing device or at a remotely in order to arrive at a relative measurement of personal risk similar to the above description (e.g., where 10 violent crimes and 5 non-violent crimes may be multiplied by relative constants 10 and 5 to arrive at a total crime rate value of 125, which may then be mapped to the medium personal risk level or numerical rate matching a range of 75-150, below which a low personal risk level or numerical rate may be determined and above which a high personal risk level or numerical rate may be determined). Other possibilities exist as well.

As a third example, the electronic computing device at block 304 may retrieve a real-time crime rate associated with the vehicle destination location as one of the vehicular perimeter contextual parameters. Real-time crime rates may be stored locally (and continuously updated over-the-air) at the electronic computing device or remotely at, for example, cloud compute cluster 160, for various geographic areas (e.g., jurisdictions, buildings, towns, etc.) that the vehicle is likely to visit, and a particular real-time crime rate retrieved from the local database or remote database by matching the vehicle destination location identified at block 302 with a location in the real-time crime rate database. For example, and in contrast to historical crime rates, real-time crime rates may reflect a currently occurring or very recently occurring number of events (such as robberies, thefts) or size of an event (large protest, mob action, etc.) at or near (e.g., within 1-10 miles or within same city, county, state, or country). The retrieved real-time crime rate may be a relative real-time crime rate determined over a past number of minutes (e.g., 10-60), hours (e.g., 1-24), or days (e.g., 1-5), such as high crime rate (or numerical rate of 8-10), a medium crime rate (or numerical rate of 4-7), or a low crime rate (or numerical rate of 1-3) as defined in the database, or may be an overall measured real-time crime rate (e.g., such as 2 violent incidents and 2 non-violent incidents in the last 60 minutes, 4 hours, or 2 days, among various other possible absolute measurements) that may then be compared by the electronic computing device to threshold values of real-time crime rates stored at the electronic computing device or at a remote computing device in order to arrive at a relative measurement of personal risk similar to the above description (e.g., where 2 violent crimes and 2 non-violent crimes may be multiplied by relative constants 20 and 10 to arrive at a total crime rate value of 60, which may then be mapped to the medium personal risk level or numerical rate matching a range of 50-75, below which a low personal risk level or numerical rate may be determined and above which a high personal risk level or numerical rate may be determined). Other possibilities exist as well.

Similar to the description above with respect to block 302, the electronic computing device may retrieve (e.g., locally or request from a remote device) the one or more (or all of the) vehicular perimeter contextual parameters responsive to detecting that the vehicle has come to a stop, or may retrieve the one or more (or all of the) vehicular perimeter contextual parameters responsive to reception of an intended destination of the vehicle such as via a mapping or routing application user interface or via reception of a dispatch instruction from dispatch console 158, among other possibilities. In still other embodiments, the one or more vehicular perimeter contextual parameters may be provided to the electronic computing device (without it having to request) accompanying (e.g., in a same data packet, transmission, or set of transmissions) the vehicle destination location of block 302 associated with the incident.

In some embodiments, retrieving the one or more vehicular perimeter contextual parameters at block 304 may include retrieving both (i) the incident type associated with the vehicle destination location and (ii) one of the historical crime rate associated with the vehicle destination location and the real-time crime rate associated with the vehicle destination location, and in still other embodiments, may include retrieving all of (i) the incident type associated with the vehicle destination location and (ii) the historical crime rate associated with the vehicle destination location and (iii) the real-time crime rate associated with the vehicle destination location. Other vehicular perimeter contextual parameters could be retrieved as well, in same or different ways to those set forth above.

Processing then proceeds to block 306, where the electronic computing device modifies one or more perimeter distances of a sized vehicular geofence surrounding the vehicle as a function of the one or more vehicular perimeter contextual parameters. As discussed previously, the one or more perimeter distances may be a parameter stored locally at the electronic computing device and used to compare against breach distances detected by one or more electronic ranging devices such as at the integrated vehicular appliance 120 of FIG. 1 and provided to the electronic computing device, or may be a value or values provided by the electronic computing device to the one or more electronic ranging devices that may be used by the electronic ranging devices to determine when breach notifications should be provided to the electronic computing device.

The one or more perimeter distances may be, for example, a single value that essentially establishes a sized vehicular geofence having a substantially even radius (e.g., a circular-shaped sized vehicular geofence) surrounding the vehicle.

As just one example, where the one or more electronic ranging devices is made up of a plurality of distributed ranging devices in the manner set forth earlier, providing the same single perimeter distance to each electronic ranging device for the purposes of filtering detected breaches, or applying the same single perimeter distances value to notifications of breaches from each of the ranging devices, would provide a sized vehicular geofence substantially approaching a circle shape.

In other embodiments, a sized vehicular geofence is formed using two perimeter distances (e.g., such as length and width) that establishes varying distances surrounding the vehicle. Using the same example just described where the one or more electronic ranging devices are made up of a plurality of distributed electronic ranging devices in the manner set forth earlier, providing a first same perimeter distance to first opposing distributed ranging devices (such as on the sides of the vehicle) and a second same perimeter distance different from the first perimeter distance to second opposing distributed ranging devices (such as at a front and rear of the vehicle) for the purposes of filtering detecting breaches, or applying the first same perimeter distance value to notifications of breaches from each of the first opposing distributed ranging devices and applying the second same perimeter distance value to notifications of breaches from each of the second opposing distributed ranging devices, would provide a sized vehicular geofence substantially approaching an oval or a square shape. Other more complex shapes using additional perimeter distances and additional electronic ranging devices could be used as well, including examples where the center of the sized geofence is offset (e.g., in the range of 1-10 feet) from a center of the vehicle to emphasize a particular half or quadrant of the vehicle perhaps closest to a detected driver or passenger or perhaps closest to a direction facing towards an incident location from the detected vehicle destination location, among other possibilities.

At block 306, the electronic computing device then modifies the one or more perimeter distances as a function of the one or more vehicular perimeter contextual parameters retrieved at block 304. In those embodiments where the vehicular perimeter contextual parameter includes incident type, the electronic computing device may maintain the incident type to risk level mapping as noted above in block 304. The relative level of risk based on the incident type may then be retrieved and used to access a second mapping that may map a personal risk level or numerical risk level to particular perimeter distances (e.g., absolute distances such as 1-10 m or 5 m for low-level personal risk levels, 10-20 m or 15 m for medium personal risk levels, and 20-30 m or 25 m for high personal risk levels) or to particular perimeter distance multipliers (e.g., perimeter distance multiplier of 1 for low-level personal risk levels, 2 for medium personal risk levels, and 3 for high personal risk levels, all of which may be multiplied against a default perimeter distance of 10 m) that may then be applied at block 308 (i.e., implemented at the electronic computing device to filter breach notification distances provided by the one or more ranging devices or provided to the one or more ranging devices to filter breach distances at the ranging device(s) themselves). In other embodiments, a mapping stored at the electronic computing device or made accessible to the electronic computing device at a remote device may directly map incident type to an associated perimeter distance or distance multiplier such as 5 m (or 1× multiplier) for noise level complaints, 15 m (or 2× multiplier) for trespassing report, and 25 m (or 3× multiplier) for homicide report.

In those embodiments where the vehicular perimeter contextual parameter includes historical crime rate, the electronic computing device may maintain the historical crime rate to risk level mapping as noted above in block 304. The relative level of personal risk based on the historical crime rate may then be used to access the same or different second mapping as set forth above that may map a personal risk level to particular perimeter distances that may then be applied at block 308. In other embodiments, a mapping stored at the electronic computing device or made accessible to the electronic computing device at a remote device may directly map historical crime rate to an associated perimeter distance or distance multiplier such as 5 m (or 1× multiplier) for total historical crime rate values of 1-75, 15 m (or 2× multiplier) for total historical crime rate values of 75-150, and 25 m (or 3× multiplier) for total historical crime rate values of greater than 150.

In those embodiments where the vehicular perimeter contextual parameter includes real-time crime rate, the electronic computing device may maintain the real-time crime rate to risk level mapping as noted above in block 304. The relative level of personal risk based on the real-time crime rate may then be used to access the same or different second mapping as set forth above that may map a personal risk level to particular perimeter distances that may then be applied at block 308. In other embodiments, a mapping stored at the electronic computing device or made accessible to the electronic computing device at a remote device may directly map real-time crime rate to an associated perimeter distance or distance multiplier such as 5 m (or 1× multiplier) for total real-time crime rate values of 1-75, 15 m (or 2× multiplier) for total real-time crime rate values of 75-150, and 25 m (or 3× multiplier) for total real-time crime rate values of greater than 150.

In those embodiments in which two or more (or all three) perimeter contextual parameters are present, overall calculated average perimeter distance(s) between all of the present corresponding perimeter contextual parameters or maximum calculated perimeter distance(s) between all of the present corresponding perimeter contextual parameters may be used at block 306. In other embodiments, weighted averages may be used that may apply a weighted multiplier (such as 1.2×) to one of the perimeter distances associated with a particular one of the perimeter contextual parameters (such as real-time crime rate) greater than a weighted multiplier (such as 0.8×) applied to another one of the perimeter distances associated with a second particular one of the perimeter contextual parameters (such as historical crime rate). Other combinations and multiplier values are possible as well.

In still other embodiments, other events outside of the retrieved vehicular perimeter contextual parameters may also impact the perimeter distances used at block 306.

In some embodiments, the electronic computing device, in cooperation with the one or more electronic ranging devices, may already be monitoring for breaches and modifying the vehicular perimeter sizing parameter(s) at block 306 may include modifying the vehicular perimeter sizing parameter(s) so that the monitoring continues but with the newly modified perimeter distances. In other embodiments, the electronic computing device may not be monitoring at all prior to block 302, and modifying the vehicular perimeter sizing parameter(s) at block 306 may include newly setting the vehicular perimeter sizing parameter(s) or providing variations to default values for the vehicular perimeter sizing parameter(s) so that when monitoring is subsequently enabled at block 308, monitoring begins with the newly modified perimeter distances.

In still further embodiments, the electronic computing device may cause a display to display the to-be-modified one or more perimeter distances for the sized vehicular geofence, for example at the vehicular computing device 108 of FIG. 1, and allow the proposed distances to be modified by the user prior to or after beginning monitoring of the sized vehicular geofence. For example, the officer 104 may determine that the size of the sized vehicular geofence should be reduced on one side of the vehicle, and may be able to further modify the parameter before, as, or just after it is used to start monitoring for breaches. Any modification made to the sized vehicular geofence may then be stored at the electronic computing device in association with the vehicle destination location, or stored at a remote location, and then used in the future to similarly modify the sized vehicular geofence when the electronic computing device detects the same vehicle destination location.

FIG. 4A sets forth an example plan view 400 of the vehicle 102 of FIG. 1 in which a vehicle destination location 402 is identified commensurate with block 302, one or more vehicular perimeter contextual parameters retrieved commensurate with block 304, and perimeter distances established/modified commensurate with block 306. As illustrated in FIG. 4A, a sized vehicular geofence 410 is established having a first perimeter distance 412 having a first value of approximately 10 m measured from integrated vehicular appliance 120 (containing one or more electronic ranging devices as described with respect to FIG. 1) and having a second perimeter distance 414 having a second value of approximately 5 m measured from integrated vehicular appliance 120. The resulting oval-shaped sized vehicular geofence 410 is thereafter monitored by, for example, integrated vehicular appliance 120 in cooperation with vehicular computing device 108 to identify breaches of the sized vehicular geofence 410 in one or more of the methods or configurations as set forth earlier. As illustrated in FIG. 4A, an unknown human potential perpetrator 420 is illustrated approaching from behind (SW in cardinal direction) the vehicle 102, but has not yet breached the sized vehicular geofence 410 and, as a result, no notification of breach is provided to any target electronic device consistent with process 300. FIG. 5, while discussed in more detail below regarding a detected breach, illustrates an example plan view 500 where first and second perimeter distances 512, 514 may be expanded relative to perimeter distances 412, 414 after detected that one or more vehicle 102 occupants first officer 104 and second officer 106 have exited the vehicle 102.

Returning to FIG. 3, processing then proceeds to block 308, where the electronic computing device detects, via one of a 360 degree vehicular light imaging or RADAR distancing system physically coupled to the vehicle and communicably coupled to the electronic communication device, such as the integrated vehicular appliance 120 described with respect to FIG. 1, a breach of the sized vehicular geofence.

As noted earlier, detecting a breach as a function of the modified perimeter distances set at block 306 may be performed at the 360 degree vehicular light imaging or RADAR distancing system (such as the integrated vehicular appliance 120) or at an electronic computer device separate from but communicatively coupled to the 360 degree vehicular light imaging and RADAR distancing system (such as at the vehicular computing device 108 of FIG. 1).

The actual detection of the breach may be performed in any one or more of the ways as set forth earlier using one or both of the 360 degree vehicular light imaging and RADAR distancing systems, and in some embodiments, a breach detected via a first one of the 360 degree vehicular light imaging or RADAR distancing system may be used to confirm a breach detected via the other of the 360 degree vehicular light imaging or RADAR distancing system. In those embodiments where the distancing system that detects the breach is a visible light imaging system (or where another electronic computing device detects the breach may request the visible light imaging system to do so), the visible light imaging system may capture one or more images of the object or person that is detected to have breached the sized vehicular geofence, and may provide the captured one or more images to the electronic computing device for display or further transmission to other computing devices (such as, but not limited to, radio 105 or dispatch console 158). Where the visible light imaging system includes a plurality of offset electrical ranging/imaging devices, the image may be captured by the particular electrical ranging/imaging device that detected the breach and that has a less than 360 degree view (such as the static visible light imaging device 120A having an approximate 90° field of view) or, where the visible light imaging system includes a 360 degree view and single imaging sensor, the image may be sub-sampled to a 30, 45, 60, or 90 degree view that includes the object detected to have breached.

In those embodiments where the distancing system that detects the breach is a RADAR distancing system (or where another electronic computing device detects the breach may request the RADAR distancing system to do so), the RADAR distancing system may generate (or the electronic computing device may generate using direction and ranging information provided by the RADAR distancing system) a 2-D or 3-D image of an area (e.g., entire 360 degree area or just the quadrant 90 degree or half 180 degree of the vehicle associated with the location of the detected breach, among other ranges) surrounding the vehicle and use direction and ranging information provided by the RADAR distancing system to place a symbol indicative of the relative location (distance and direction) of the breach, and similarly provide the generated 2-D or 3-D image to the electronic computing device for display or further transmission to other computing devices (such as, but not limited to, radio 105 or dispatch console 158).

For example, and with reference to FIG. 4B, the integrated vehicular appliance 120 acting as an electronic distancing system that in this example includes four displaced visible-light electronic ranging/imaging devices and a RADAR device as described with respect to FIG. 1, may detect breach of the sized vehicular geofence 410 when the object (in this example, unknown human potential perpetrator 420) crosses the sized vehicular geofence 410, via either one or both of the electronic ranging/imaging device facing the rear of the vehicle and the RADAR device scanning the entire field of view surrounding the vehicle. Once the breach is detected, the electronic ranging/imaging device portion of the integrated vehicular appliance 120 may capture an image of the unknown human potential perpetrator 420 and/or the RADAR device may generate a 2-D or 3-D image of an area surrounding the vehicle 102 and add a symbol to the image indicating a detected location (distance and direction) of the unknown human potential perpetrator 420, and the integrated vehicular appliance 120 may store the captured or generated image and/or may provide the captured or generated image to the vehicular computing device 108, among other possibilities.

Processing then proceeds to block 310, where the electronic computing device, responsive to detecting the breach at block 308, identifies one or more target electronic devices to notify of the detected breach. The identified one or more target electronic devices to notify of the detected breach may include at least one of (i) a target electronic device associated with a registered occupant of the vehicle and (ii) an audio and/or visual output target electronic device fixed to an interior or exterior of the vehicle.

As one example for identifying one or more target electronic devices associated with a registered occupant of the vehicle, the vehicular computing device 108 of FIG. 1 acting as the electronic computing device may maintain an indication of active radios to which it is currently paired via a short-range wireless communication link or links, which in this example, may include radios 105 and 107 associated with vehicular occupants first and second officers 104 and 106. In some embodiments, the electronic computing device may be configured to notify all target electronic devices currently paired with the electronic computing device, while in other embodiments, the electronic computing device may selectively chose a subset of target electronic devices currently paired with the electronic computing device to notify of the breach. The latter function may be illustrated with respect to the plan view of FIG. 5, in which first and second officers 104 and 106 carrying with them their associated radios 105 and 107 as they exit the vehicle 102 and which remain in short-range communication range with vehicular computing device 108 of vehicle 102, may roam to their locations as illustrated in FIG. 5. When a subsequent breach of the sized vehicular geofence 510 is detected via integrated vehicular appliance 120 as unknown potential perpetrator 520 walks through the sized vehicular geofence 510, the vehicular computing device 108 may use information regarding the location of the breach (as received from the integrated vehicular appliance 120) and information regarding locations of the first and second officers 104, 106 (reported as GPS location information by radios 105, 107, among other possibilities) and select only the target electronic devices as those located within the same quadrant or an adjacent quadrant (as defined by perimeter distances 512, 514 and which may, in other embodiments, align with fields-of-view of electronic ranging devices) as the breach (in this case including first officer 104 but not the second officer 106), or may select only the target electronic device located closest to the location of the breach such as officer 104, among other possible sub-selections.

As another example for identifying one or more target electronic devices associated with a registered occupant of the vehicle, the vehicular computing device 108 of FIG. 1 acting as the electronic computing device may access an assignment database, locally at the vehicular computing device 108 or remotely at the dispatch console 158, identifying a particular radio device associated with a first responder assigned to the vehicle or assigned to the incident at the vehicle location destination. For example, a CAD or dispatch record stored at dispatch console 158 or provided to vehicular computing device 108 upon dispatch or some other event, may identify a radio device such as radio 105 as associated with officer 104 or as associated with the incident at the vehicular destination location at which the vehicle 102 is now located, and may use a hardware or network address of the radio 105 included in the record to identify the radio 105 as a target electronic device to notify at block 310.

Other electronic target devices, such as a radio associated with an officer such as officer 504 or with another vehicle such as vehicle 502 unrelated to the vehicle 102 but located nearby or associated with the incident at the vehicular destination location, may be identified as well.

In a same or similar manner, but instead of identifying single target electronic devices, the vehicular computing device 108 of FIG. 1 acting as the electronic computing device may access an assignment database, locally at the vehicular computing device 108 or remotely at the dispatch console 158, assigning a particular talkgroup of radio devices associated with a first responder such as officer 104 assigned to the vehicle 102, assigned directly to the vehicle 102, or assigned to an incident occurring at the vehicle location destination. For example, a CAD or dispatch record stored at dispatch console 158 or provided to vehicular computing device 108 upon dispatch or some other event, may identify a talkgroup that may include radio 105 associated with officer 104, among other radios, and may use a talkgroup identifier of the identified talkgroup included in the record to target electronic devices to notify at block 310. The identified talkgroup may include one or more target electronic devices associated with other occupants of the vehicle or one or more target electronic devices associated with other first responders such as officer 504 dispatched to an incident at the vehicle destination location, among other possibilities.

As one example for identifying an audio and/or visual output target electronic device fixed to an exterior or interior of the vehicle, the vehicular computing device 108 of FIG. 1 acting as the electronic computing device may be configured to cause a pre-configured tone or alert associated with a geofence breach, or pre-configured spoken warning identifying a geofence breach, to be played back at interior speaker 109 or at exterior speaker 126. In some embodiments, the vehicular computing device 108 may cause all communicably coupled interior and exterior speakers to playback the tone, alert, or warning, while in other embodiments, the vehicular computing device 108 may selectively enable such speakers.

More specifically, the vehicular computing device 108 may use information regarding whether any vehicular occupants, such as first and second officers 104 and 106, are located within the vehicle 102 using any of the methods already set forth earlier to subsequently enable only internal speaker 109, and alternatively use information regarding whether any vehicular occupants, such as first and second officers 104 and 106, are located outside of the vehicle using any of the methods already set forth earlier to subsequently enable only external speaker 126, while in other embodiments both internal and external speakers may be enabled if vehicular occupants are detected both inside and outside of the vehicle.

In still other embodiments, and where internal speaker 109 includes a distributed array of speakers through the internal cabin of the vehicle, the vehicular computing device 108 may identify at block 310, using information from integrated vehicular appliance 120 regarding the location of the detected breach, only the internal speaker closest to a location of the detected breach. The same technique could be applied where external speaker 126 includes a distributed array of speakers or where the external speaker is pivotable to direct the external speaker in a direction of the breach or a determined direction of the outside-of-vehicle (prior) vehicular occupants.

As a further example for identifying an audio and/or visual output target electronic device fixed to an exterior or interior of the vehicle, the vehicular computing device 108 of FIG. 1 acting as the electronic computing device may be configured to cause an internal or external light emitting device such as external lights 122 to turn on for a period of time, including any default or configured flashing, rotation, light color, or other configuration that may or may not be preconfigured as associated with a sized vehicular geofence breach. In some embodiments, the vehicular computing device 108 may cause all communicably coupled interior and exterior lights to turn or otherwise begin a visual playback to illustrate the breach, while in other embodiments, the vehicular computing device 108 may selectively enable such internal and/or external lights.

More specifically, the vehicular computing device 108 may use information regarding whether any vehicular occupants, such as first and second officers 104 and 106, are located within the vehicle 102 using any of the methods already set forth earlier to subsequently enable only internal lights (not shown in FIG. 1) such as cabin lights, hazard indicators, or displays associated with vehicular computing device 108, and alternatively use information regarding whether any vehicular occupants, such as first and second officers 104 and 106, are now located outside of the vehicle using any of the methods already set forth earlier to subsequently enable only external lights such as lights 122, 124, while in other embodiments both internal and external lights may be enabled if vehicular occupants are detected both inside and outside of the vehicle.

In still other embodiments, and where external lights 122, 124 may be replaced by a matrixed light bar, the vehicular computing device 108 may identify at block 310, using information from integrated vehicular appliance 120 regarding the location of the detected breach, only the portion of the matrixed light bar closest to a location of the detected breach. The same technique could be applied where internal lights includes a distributed array of lights (such as left and right turn indicators that could be separately identified based on the identified location of the breach).

Processing then proceeds to block 312, where the electronic computing device, responsive to detecting the breach at block 308 and identifying one or more target electronic devices to notify of the detected breach at block 310, causes a notice of the breach to be provided to the identified one or more target electronic devices. In some examples, and especially where the target electronic device(s) is a visual or audio output device, the notice of breach may include a simple request to activate, such as a notice to external lights 122, 124 to activate or to external speaker 126 to activate. Included in the request may be a particular light pattern (flash pattern, sub-selection of matrixed lights to activate, time to activate, etc.) or a particular audio pattern (e.g., pitch, volume, stored digital file to playback, time to activate, etc.), which may then be correspondingly played back. Alternatively, the request may identify itself as a vehicular geofence breach, and a mapping stored locally at the external lights 122, 124 or external speaker 126 may choose the correct visual or audio pattern to playback to signal a vehicular geofence breach. As illustrated in FIGS. 4B and 5, as a result of the detected breach, external lights 122, 124 and external speaker 126 are enabled, among other possibilities.

In still other examples, and especially where the target electronic device is or contains an electronic display (e.g., that of vehicular computing device 108 or radios 105, 107) the notice may include location information indicative of the location of the detected sized vehicular geofence breach and, in some embodiments and where available, an image captured of the object breaching the geofence or a generated image of an area surrounding the vehicle with an inserted symbol indicative of a location of the breach, among other possibilities, which may then be displayed to a user or occupant in response to receipt of the notice.

In still further embodiments, the notice may be provided to a remote computing device such as dispatch console 158 via RAN 152, after which a dispatcher at dispatch console 158 may use other communications methods to address the breach, including notification via a talkgroup of which the dispatcher and vehicle occupants may be members. The remote computing device may additionally or alternatively include a cloud compute cluster 160 or other remote computing device at which an object or face recognition algorithm may operate on an image capture of the object breaching the sized vehicular geofence and provided in the notice at block 312. Once an object or face recognition algorithm operating at the remote computing device obtains a positive match against a known object or known face, information identifying the object (object match) or identifying the person (facial match) may be provided back to the electronic computing device for further display (e.g., at the vehicular computing device 108) or transmission to other devices such as radios 105, 107.

The notice of the breach may instruct the receiving target electronic device to continue to provide an alert or notice of breach for a preconfigured or indicated period of time, or may cause the receiving target electronic device to continue to provide the alert or notice of breach until the electronic computing device determines that the breaching object has moved back outside of the sized vehicular geofence, at which time a second notice may be caused to be provided to the same identified one or more target electronic device to stop providing the alert or notice of breach. In still other examples, the alert or notice of breach may be continued to be provided until the electronic computing device, such as the vehicular computing device 108, receives notice or indication that a vehicle occupant has acknowledged the breach, such as receiving an indication from the driver's head and/or eye-tracking device 110 of FIG. 1 that officer 104 has looked at the object or person causing the indicated breach, after which the alerting or notifications may be caused to be stopped.

3. CONCLUSION

In accordance with the foregoing, an improved device, method, and system is disclosed for dynamic perimeter threat detection for a movable vehicle.

As a result of the foregoing, a vehicular geofence may be established surrounding a vehicle, as monitored by a light imaging or RADAR distancing device physically coupled to the vehicle, that advantageously increases its distance and thus better protects and selectively notifies vehicle occupants based on detected contextual parameters such as historical crime rate, real-time crime rate, and incident type associated with an identified vehicle destination location. Accordingly, vehicle occupants receive fewer false positives due to automatic constricting adjustments to vehicular geofence sizes when risks to vehicle occupants at the identified vehicle destination location are determined to be relatively low, while distance and thus sensitivity is increased to better protect and provide earlier notifications to vehicle occupants when risks to those vehicle occupants at the identified vehicle destination location are determined to be relatively high. Furthermore, processing power and transmission bandwidth may be saved by reducing geofence sizes where appropriate, resulting in reduced power consumption and bandwidth consumption. And no manual user interaction is required to make such automatic adjustments, which increases user acceptance of the safety increasing perimeter threat detection feature.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for dynamic vehicular perimeter threat detection, the method comprising:
    identifying, by a vehicular computing device, a vehicle destination location associated with one of a current stopped location of a vehicle and a programmed destination stop location of the vehicle;
    retrieving, by the vehicular computing device, one or more vehicular perimeter contextual parameters including one or more of an incident type associated with the vehicle destination location, a historical crime rate associated with the vehicle destination location, and a real-time crime rate associated with the vehicle destination location;
    modifying, by the vehicular computing device, one or more perimeter distances of a sized vehicular geofence surrounding the vehicle as a function of the one or more vehicular geofence contextual parameters;
    detecting, via a 360 degree vehicular light imaging or radio wave distancing system physically coupled to the vehicle and communicably coupled to the vehicular computing device, a breach of the sized vehicular geofence;
    identifying, by the vehicular computing device, one or more target electronic devices to notify of the detected breach including at least one of (i) a target electronic device associated with a registered occupant of the vehicle and (ii) an audio and/or visual output target electronic device fixed to an exterior or interior of the vehicle; and responsive to detecting the breach, causing, by the vehicular computing device, a notice of breach message to be provided to the identified one or more target electronic devices.

2. The method of claim 1, wherein the radio wave distancing system is a radio direction and distance (RADAR) distancing system.

3. The method of claim 1, wherein the step of identifying one or more target electronic devices to notify of the breach including at least one of (i) a target electronic device associated with a registered occupant of the vehicle and (ii) an audio and/or visual output target electronic device fixed to an exterior or interior of the vehicle comprises identifying the target electronic device associated with the registered occupant of the vehicle.

4. The method of claim 3, wherein identifying the target electronic device associated with the registered occupant of the vehicle comprises accessing, by the vehicular computing device, a pairing database identifying a mobile radio device paired to the vehicular computing device via a short-range wireless connection.

5. The method of claim 3, wherein identifying the target electronic device associated with the registered occupant of the vehicle comprises accessing, by the vehicular computing device, an assignment database identifying a mobile radio device associated with a first responder assigned to the vehicle or assigned to the vehicle location destination.

6. The method of claim 3, wherein the step of identifying one or more target electronic devices to notify of the breach including at least a target electronic device associated with a registered occupant of the vehicle comprises identifying a talkgroup having a plurality of members including the registered occupant of the vehicle, and wherein causing the notice of breach message to be provided to the identified one or more target electronic devices comprises causing the notice of breach message to be provided to the talkgroup.

7. The method of claim 6, wherein the talkgroup further includes one or more target electronic devices associated with other occupants of the vehicle or one or more target electronic devices associated with other first responders dispatched to an incident at the vehicle destination location.

8. The method of claim 1, wherein the step of identifying one or more target electronic devices to notify of the breach including at least one of (i) a target electronic device associated with a registered occupant of the vehicle and (ii) an audio and/or visual output target electronic device fixed to an exterior or interior of the vehicle comprises identifying the audio and/or visual output target electronic device fixed to an exterior of the vehicle.

9. The method of claim 8, wherein the audio and/or visual output target electronic device is one of a vehicle siren and a vehicle light bar, and wherein the notice of breach message is an instruction to one of activate the vehicle siren and activate at least a portion of the vehicle light bar.

10. The method of claim 1, wherein the step of retrieving, by the vehicular computing device, one or more vehicular perimeter contextual parameters including one or more of an incident type associated with the vehicle destination location, a historical crime rate associated with the vehicle destination location, and a real-time crime rate associated with the vehicle destination location comprises retrieving the incident type associated with the vehicle destination location.

11. The method of claim 10, the method further comprising accessing an incident type to risk level mapping as a function of the incident type and using an identified distance variation value via the mapping to vary the one or more perimeter distances of the vehicular geofence based on the incident type.

12. The method of claim 11, wherein the incident type to risk level mapping sets forth relatively higher distance variation values for violent crime incident types and sets forth relatively lower distance variation values for non-violent crime incident types.

13. The method of claim 1, wherein the step of retrieving, by the vehicular computing device, one or more vehicular perimeter contextual parameters including one or more of an incident type associated with the vehicle destination location, a historical crime rate associated with the vehicle destination location, and a real-time crime rate associated with the vehicle destination location comprises retrieving the historical crime rate associated with the vehicle destination location.

14. The method of claim 13, the method further comprising accessing an historical crime rate to risk level mapping as a function of the retrieved historical crime rate and using an identified distance variation value via the mapping to vary the one or more perimeter distances of the vehicular geofence based on the historical crime rate.

15. The method of claim 1, wherein the step of retrieving, by the vehicular computing device, one or more vehicular perimeter contextual parameters including one or more of an incident type associated with the vehicle destination location, a historical crime rate associated with the vehicle destination location, and a real-time crime rate associated with the vehicle destination location comprises retrieving the real-time crime rate associated with the vehicle destination location.

16. The method of claim 15, the method further comprising accessing a real-time crime rate to risk level mapping as a function of the retrieved real-time crime rate and using an identified distance variation value via the mapping to vary the one or more perimeter distances of the vehicular geofence based on the real-time crime rate.

17. The method of claim 1, wherein the step of detecting, via the 360 degree vehicular light imaging or radio wave distancing system physically coupled to the vehicle and communicably coupled to the vehicular computing device, the breach of the sized vehicular perimeter breach geofence comprises detecting, via the 360 degree vehicular light imaging distancing system physically coupled to the vehicle and communicably coupled to the vehicular computing device, the breach of the sized vehicular perimeter breach geofence; and wherein the vehicular light imaging distancing system includes a visible light imaging device that is further configured to, responsive to detecting the breach of the sized vehicular perimeter breach geofence, capture an image of a person or object detected as breaching the geofence and provide, accompanying the notice of breach message or subsequent to the notice of breach message, the captured image to the identified one or more target electronic devices.

18. The method of claim 1, further comprising, responsive to detecting that the vehicle has stopped at the current stopped location or has received a dispatch instruction to move to the programmed destination stop location, retrieving, from the dispatch instruction or from a remote database via a wireless communications link, the one or more vehicular perimeter contextual parameters associated with the vehicle destination location.

19. The method of claim 1, wherein retrieving the one or more vehicular perimeter contextual parameters including one or more of an incident type associated with the vehicle destination location, a historical crime rate associated with the vehicle destination location, and a real-time crime rate associated with the vehicle destination location comprises retrieving both (i) the incident type associated with the vehicle destination location and (ii) one of the historical crime rate associated with the vehicle destination location and the real-time crime rate associated with the vehicle destination location.

20. An electronic processing system for dynamic vehicular perimeter threat detection, the system comprising:
   a memory;
   a transceiver;
   one of a 360 degree vehicular light imaging and a radio wave distancing system physically coupled to a vehicle; and
   one or more processors configured to:
      identify a vehicle destination location associated with one of a current stopped location of a vehicle and a programmed destination stop location of the vehicle;
      retrieve one or more vehicular perimeter contextual parameters including one or more of an incident type associated with the vehicle destination location, a historical crime rate associated with the vehicle destination location, and a real-time crime rate associated with the vehicle destination location;
      modify one or more perimeter distances of a sized vehicular geofence surrounding the vehicle as a function of the one or more vehicular geofence contextual parameters;
      detect, via the one of the 360 degree vehicular light imaging and radio wave distancing system physically coupled to the vehicle and communicably coupled to the one or more processors, a breach of the sized vehicular geofence;
      identify one or more target electronic devices to notify of the detected breach including at least one of (i) a target electronic device associated with a registered occupant of the vehicle and (ii) an audio and/or visual output target electronic device fixed to an exterior or interior of the vehicle; and
      responsive to detecting the breach, cause a notice of breach message to be provided, via the transceiver, to the identified one or more target electronic devices.

\* \* \* \* \*